April 19, 1938.  W. H. SAID  2,114,403
CULINARY VESSEL
Filed July 6, 1936
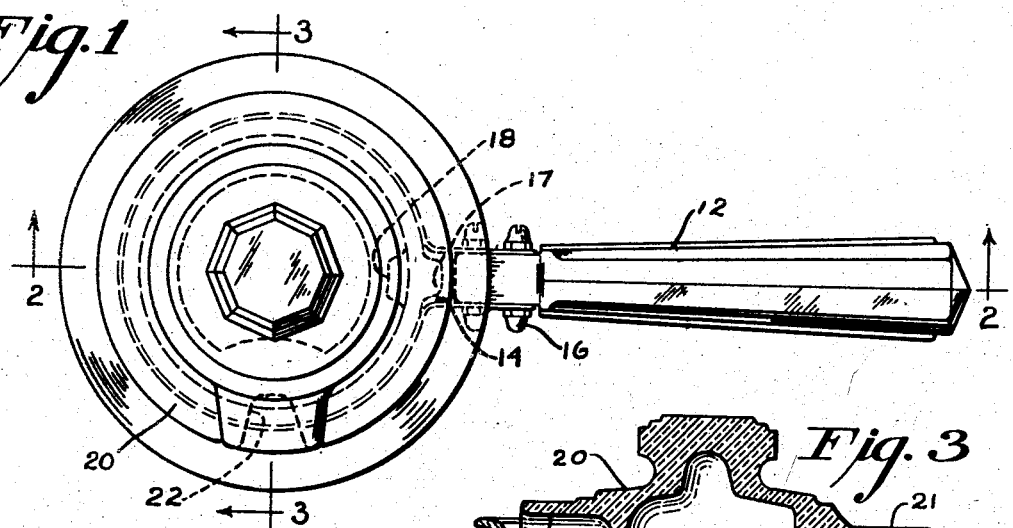
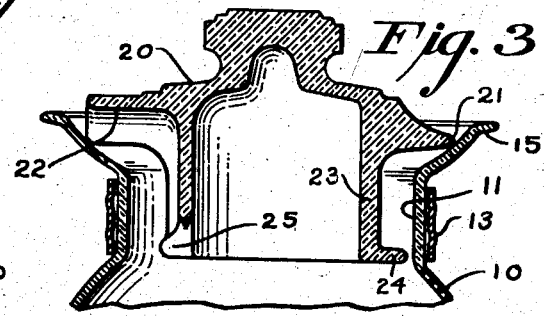
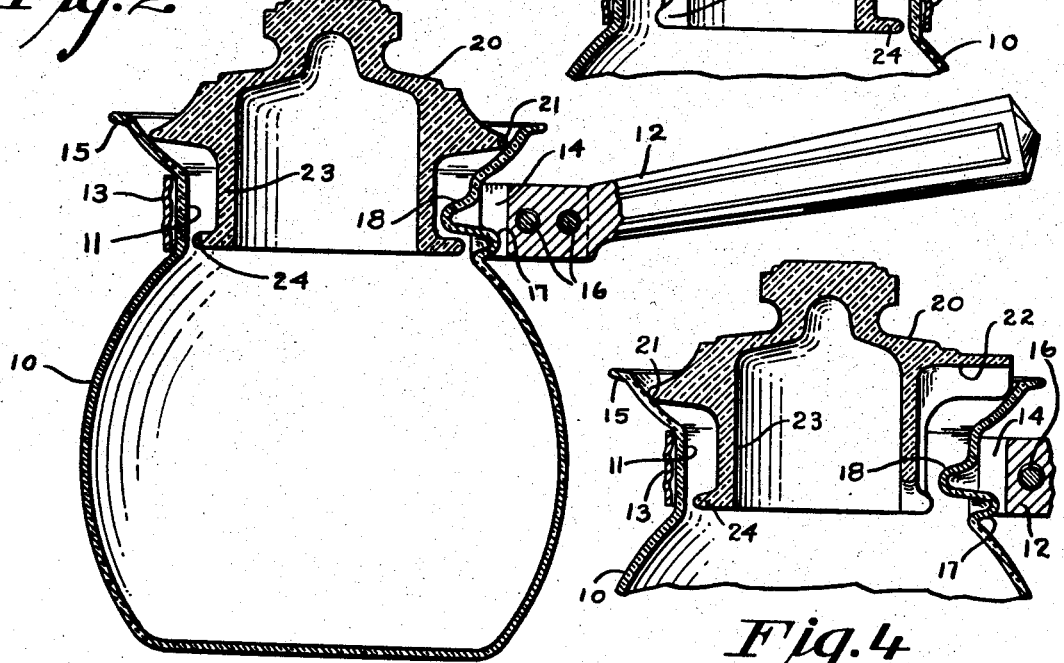
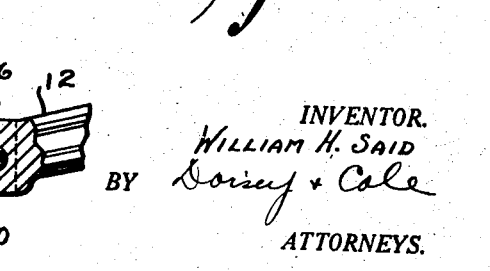
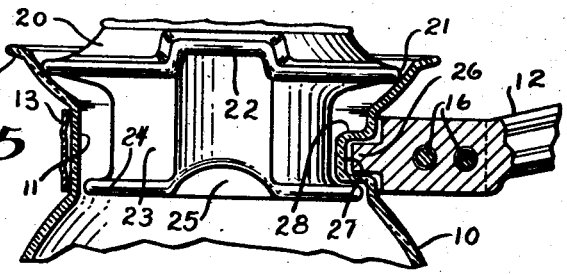
INVENTOR.
WILLIAM H. SAID
BY Dorsey & Cole
ATTORNEYS.

Patented Apr. 19, 1938

2,114,403

UNITED STATES PATENT OFFICE 2,114,403

CULINARY VESSEL

William Howard Said, Corning, N. Y., assignor to Corning Glass Works, Corning, N. Y., a corporation of New York Application July 6, 1936, Serial No. 89,183

4 Claims. (Cl. 53—3)

The present invention relates in general to culinary vessels and particularly to teapots and the like.

It is well recognized that heat resistant glass is an ideal material from which to fabricate culinary vessels, and particularly vessels to be used in the concoction of liquids, such as tea and the like, which have their flavor impaired by contact with metallic vessels.

A vessel, to be convenient and desirable for us as a teapot or the like, should also be provided with a lid which remains in place during the pouring operation and should have a cool handle securely fixed thereto. These latter features may be readily incorporated in metallic vessels, but in glass vessels present problems more difficult of solution.

An object of this invention is to produce a glass vessel from which liquids may be readily poured without danger of the lid becoming displaced therefrom.

A feature of the invention embodies a vessel, having a lid and handle, provided with means for holding the lid thereof in place in such a manner that liquids may be poured therefrom in almost any direction while the lid remains in position thereon.

Another feature includes means for securely holding the handle in a definite position with respect to the vessel.

A still further feature includes the provision of a channel in the lid cooperative with a part of one of the previously mentioned means during the placement of the lid on the vessel and subsequently serving as a path for the flow of liquid therefrom.

In the drawing

Fig. 1 is a plan view of a teapot embodying my invention;

Fig. 2 is a sectional elevation taken on line 2—2 of Fig. 1;

Fig. 3 is a fragmentary sectional elevation taken on line 3—3 of Fig. 1;

Fig. 4 is a view similar to Fig. 3, but with the lid rotated in position for removal; and Fig. 5 is a fragmentary view illustrating a modified embodiment of my invention.

The vessel illustrated comprises a glass teapot 10 having a neck 11 and a flared lip 15 extending completely around its neck. A handle 12 is secured in fixed relation to the pot by bolts 16 passing through the open ends 14 of a band 13 extending substantially around the neck 11. A nib 17 protruding from the outside wall of the neck 11 is located between ends 14 of the band adjacent the fixed end of handle 12 to prevent rotation of the band and handle with respect to the pot. A nib 18 on the inner wall of neck 11 and opposite nib 17, but slightly above the level of the latter nib, is provided to hold the lid on the pot, as will appear subsequently.

The pot lid comprises a cover portion 20, the periphery 21 of which, except for an inverted trough portion 22 thereof, rests on the flared lip 15 of the pot. The lid is also provided with a downwardly extending wall 23 having an outwardly flared rim 24, cooperative with the nib 18 to hold the lid in place, as will subsequently be more fully brought out. At a point immediately below the inverted trough portion 22 (Fig. 5), a segment of rim 24 and a coinciding semicircular segment of wall 23 are omitted to form a fluid passage 25. Also, that portion of wall 23 arranged below trough 22 is curved in a direction to form a channel connecting trough 22 and passage 25, thereby providing a free path for the flow of liquid from the pot while the lid is in place thereon.

In the use of the pot the lid is placed thereon by facing the trough 22 towards the handle 12 (Fig. 4), in which position the nib 18 passes through passage 25, enabling the periphery 21 of the lid to rest naturally on lip 15. The lid may now be rotated to bring the trough 22 to any convenient position for pouring. As soon as the trough is rotated out of alignment with handle 12, the rim 24 is carried under nib 18 (Fig. 2) and becomes effective to hold the lid in place, so that pouring can be proceeded with with perfect safety.

Particular attention is called to the double use of passage 25, it first being employed as a passageway for nib 18 and subsequently for enabling the unobstructed flow of fluid to trough 22.

In the alternative construction illustrated by Fig. 5 the cooperative relation of the lid and pot remain unchanged. The rotation of handle 12, however, is prevented by an extension 26 at the end thereof arranged to enter a pocket 27 in the outer wall of neck 11 caused by the formation of the lid holding nib 28.

From the foregoing it will be seen that I have succeeded in devising a very simple form of glass vessel from which liquids may be poured without danger of the lid becoming displaced therefrom and the constructural details of which may, of course, be varied without departing from the spirit and scope of my invention as set forth in the appended claims.

What is claimed is:

1. In a vessel and lid assembly, a nib on the inner wall of the vessel registering with a pouring channel in the lid thereof when the open side of such channel is directed toward a handle on the vessel, and means on the lid cooperative with said nib when the lid is rotated with respect to the vessel for holding the lid in place while the vessel is being tilted as in a pouring operation.

2. In a vessel and lid assembly, a lid having a fluid passageway therein, a nib on an inner wall of the vessel cooperative with a portion of such passageway when positioning the lid on the vessel, and a flanged rim on the lid thereof cooperative with said nib to hold the lid in place while liquid is being poured from the vessel.

3. In a vessel and lid assembly, a nib on one part of the assembly cooperative with a passageway for liquid in the other part of the assembly during the placement of the lid on the vessel; and means cooperative with said nib, by rotation of one part of the assembly with respect to the other, for locking the lid against displacement when the assembly is tilted as in a pouring operation.

4. In a vessel and lid assembly, a nib on the vessel cooperative with a passageway for liquid in the lid during the placement of the lid on the vessel, and means on the lid cooperative with said nib, by rotation of the lid with respect to the vessel, for locking the lid against displacement when the assembly is tilted as in a pouring operation.

WILLIAM HOWARD SAID.